Aug. 29, 1939.  R. K. WINNING  2,171,073
MOTOR VEHICLE SWITCH
Filed Feb. 5, 1934   2 Sheets-Sheet 1
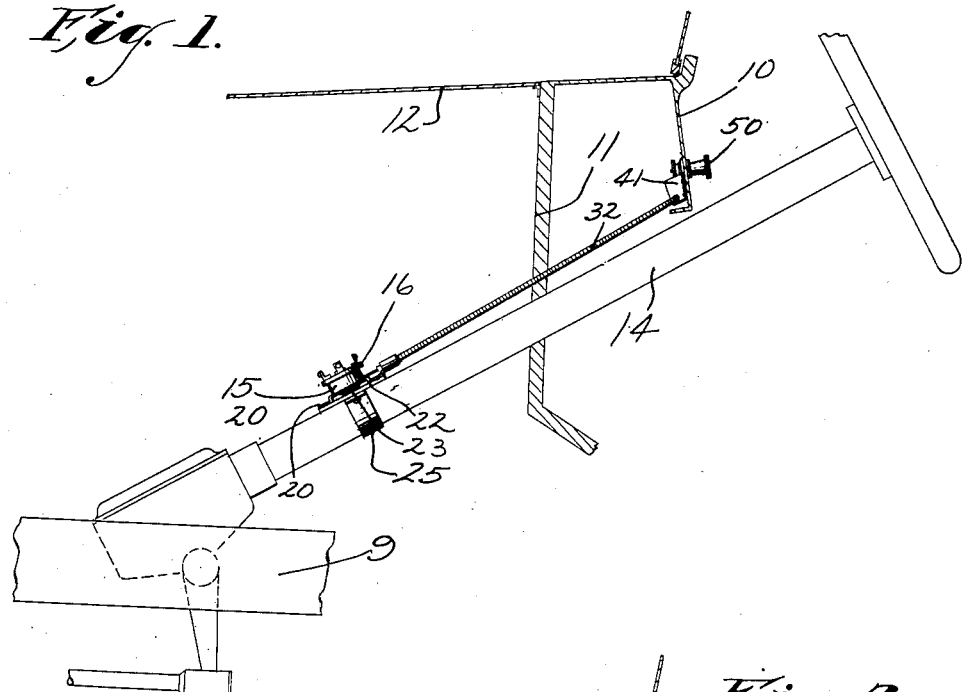
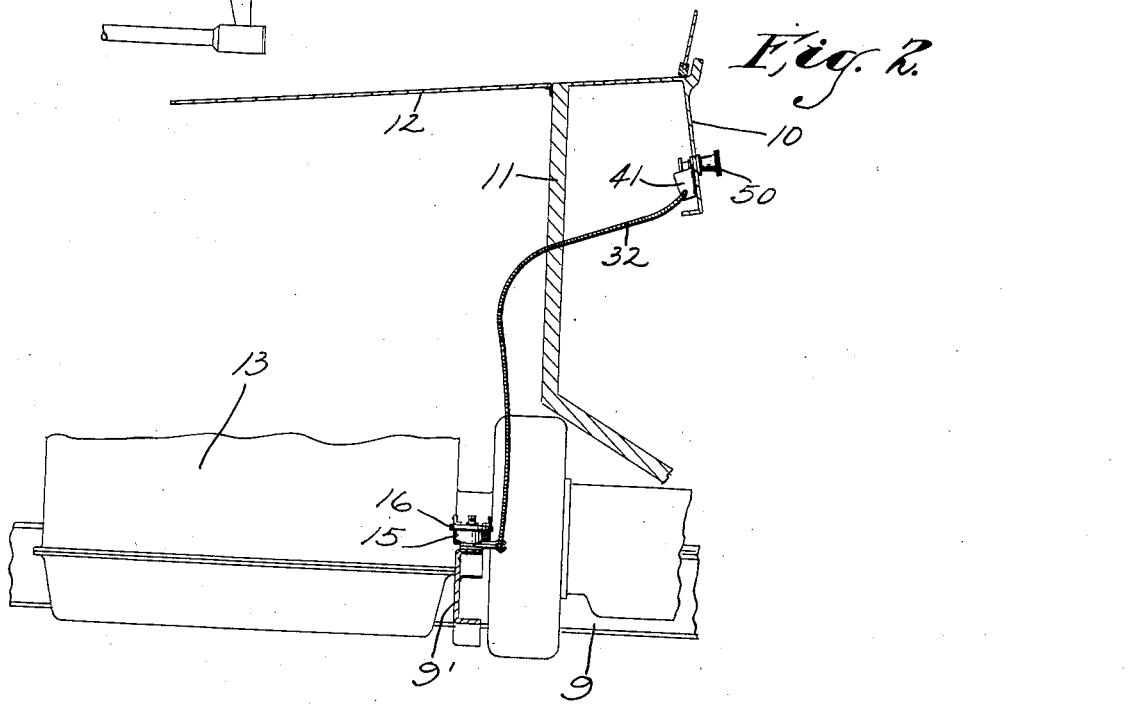
INVENTOR
Robert K. Winning
BY
Wheeler, Wheeler and Wheeler
ATTORNEYS Aug. 29, 1939.   R. K. WINNING   2,171,073
MOTOR VEHICLE SWITCH
Filed Feb. 5, 1934.   2 Sheets-Sheet 2
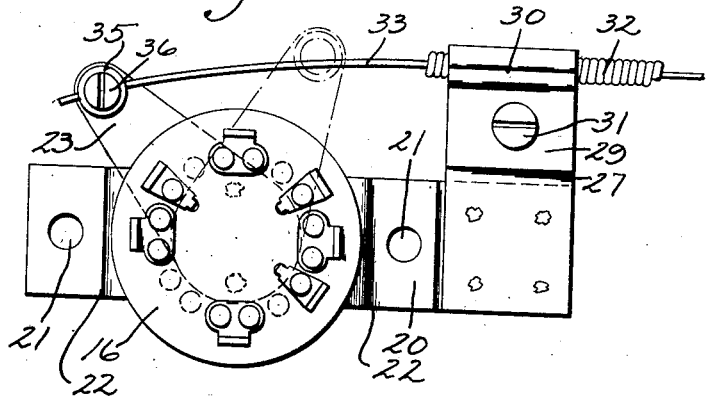
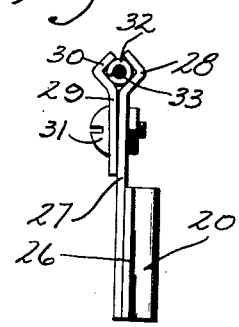
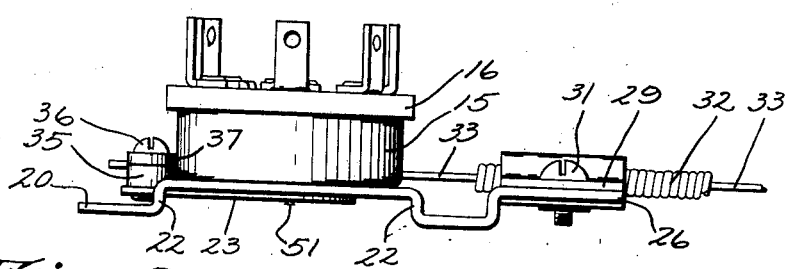
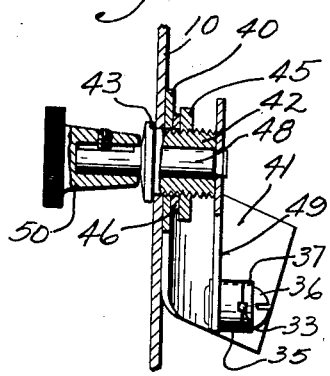
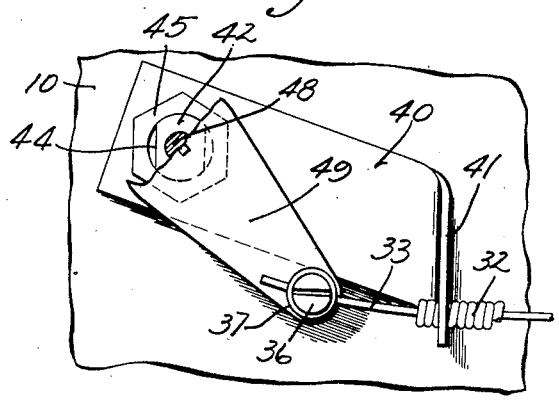
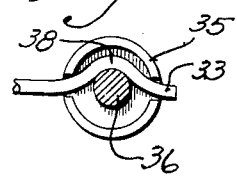
INVENTOR
Robert K. Winning
BY
Wheeler, Wheeler and Wheeler
ATTORNEYS Patented Aug. 29, 1939

2,171,073

UNITED STATES PATENT OFFICE 2,171,073

MOTOR VEHICLE SWITCH

Robert K. Winning, Wauwatosa, Wis., assignor to Clum Manufacturing Company, Milwaukee, Wis., a corporation of Wisconsin Application February 5, 1934, Serial No. 709,729

5 Claims. (Cl. 74—501)

This invention relates to improvements in the motor vehicle switch art.

It is the primary object of the invention to simplify the assembly of an automobile having a switch mechanism embodying the present invention. This result is attributable to the fact that the present invention includes a remote control switch, the switch proper being mounted on some portion of the automobile frame, where all of the wiring will be completed prior to the attachment of the body to the frame, the only part requiring connection to the body being the remote control mechanism which leads to the instrument panel.

It is conventional automotive practice to mount the generator, battery, ignition mechanism, lights, and the horn either directly upon the frame of the vehicle or upon such parts as are associated with the frame prior to the attachment of the body. In referring to the lights reference is, of course, made to those lights controlled by the main lighting switch as distinguished from tonneau lights and other lights having special switches. Notwithstanding the fact that all, or practically all, of the electrical equipment operated by the main lighting switch is associated with the frame, the said switch has heretofore always been placed in the body on the instrument panel, so that the several electrical connections to the switch have been made with great inconvenience in limited quarters behind the instrument panel after the body has been set in place on the frame, or on the steering column where the switch is in the grease and the construction is expensive.

In accordance with the present invention the switch mechanism is located at any convenient point either directly on the frame or upon some part, such as the steering gear, which is secured to the frame in advance of the body. In this location, prior to the attachment of the body, the switch is fully exposed and all wiring connections thereto can be made with great ease as contrasted with the difficulty of establishing such connections in the past. When the body is in place, the remote control mechanism may be mounted on the instrument panel, preferably through a single opening in the panel. Since the remote control connections are already unitarily assembled with the switch, and fully operable, it is not necessary to make any awkward installation behind the instrument panel and material economies in time, labor and expense are thereby effected.

More specifically, it is the object of the invention to provide a remote control general lighting switch for automotive purposes, the switch being adapted for attachment to the frame and the remote control mechanism unitarily connected with the switch and adapted to be mounted on the instrument panel.

In the drawings:

Figure 1 is a fragmentary cross section of a motor vehicle structure showing a unitary switch and remote control device installed thereon.

Figure 2 is a view similar to Figure 1 showing a somewhat different installation of the switch.

Figure 3 is an enlarged front elevation of the switch structure.

Figure 4 is an end elevation of the bracket shown in Figure 3.

Figure 5 is a plan view of the switch and bracket shown in Figure 3.

Figure 6 is an enlarged transverse section shown in a detail of the actuating means for the remote control device.

Figure 7 is a rear elevation thereof partially broken away.

Figure 8 is a further enlarged detail showing the Bowden wire anchorage preferably employed.

Like parts are identified by the same reference characters throughout the several views.

In Figs. 1 and 2 I have illustrated conventionally many of the usual standard parts of a motor vehicle, including a frame 9, a body comprising an instrument panel 10, a dash 11, hood 12, engine 13, and steering column 14.

The switch casing 15 has a terminal head 16 carrying suitable terminals for electrical connections and housing switch mechanism of any desired type such, for example, as that shown in Patent No. 1,810,994 or 1,919,345. The casing is supported on a bracket 20 apertured at 21 for mounting bolts, and offset at 22 to provide clearance between the mounted portions within which the operating lever 23 may be oscillated.

In the construction shown in Figs. 1 and 2 the bracket 20 is bolted directly to the cross member 9' of the frame. It might similarly be applied to any other suitable surface on the frame and those parts which may collectively be treated as a part of the frame because they are assembled prior to the mounting of the body. By way of exemplifying the fact that the bracket is adapted for association with other special mounting devices, I have shown in Fig. 1 an arrangement whereby a mounting strap 25 encircles the steering column 14 and provides means to which the bracket 20 has been applied.

The portion 26 of the bracket, offset into the plane of bracket portion 22, carries an arm 27 terminating at an angularly formed finger 28 which comprises one side of a clamp. Coacting therewith is a plate 29 having a complementary angularly formed finger portion 30 and held to arm 27 by means of a bolt 31. Between the fingers 28 and 30 is engaged the end of a Bowden wire sheath 32 from which the Bowden wire 33, reciprocable therein, projects for connection with the switch lever 22. Mounted on the end of this lever is a diametrically slotted cylindrical receptacle 35 held thereto by bolt 36 and washer 37. The Bowden wire is kinked at 38 to enable it to be passed through the slots of the receptacle 35 and about the shank of bolt 36. When the bolt 36 is tightened down in this position it will hold the wire tightly in place to provide an adjustable anchorage or connection between the wire and the lever. The adjustment may be made by kinking the wire at any other point and reinserting it within the receptacle.

At the other end of the Bowden wire is a panel mounting bracket 40 which lies in face contact with the panel but has a rearwardly projecting arm 41 with an aperture in which the Bowden wire sheath is inserted, as shown in Fig. 7. The aperture may be sufficiently small so that the helically wound sheath may be anchored by screwing it into the aperture. The bracket 40 is held to the panel by means of a flat sided tubular bolt 42 headed at 43 for engagement with the outer face of the panel, the aperture in the panel and the bracket having corresponding flat sides engaging the flat sides 44 of the bolt, as shown in Fig. 7. A nut 45 screw threaded to the bolt and tightened against a washer 46 at the rear of the bracket 40 holds the bracket firmly clamped to the panel.

Rotatable in the tubular nut 42 is a rock shaft 48 inserted therein from the rear and rigidly connected at its rear end to the lever 49. At its forward end any desired type of operating handle 50 is applied to hold the rock shaft in place and serve as a means of oscillating it. The identical Bowden wire anchorage used at the switch is also employed to connect the wire 33 with lever 49, as shown in Figs. 6 and 7.

The oscillatory movement of the switch handle 50 on the instrument panel is made to reciprocate the Bowden wire 33 in its sheath 32, thereby causing an oscillation of the switch lever 23 corresponding identically to the oscillation of the actuating lever 49. This motion is transmitted through stub shaft 51 to the circuit closing mechanism within the casing 15, whereby the current flow between the several switch terminals is controlled as desired.

It will be apparent from the foregoing description that a switch made in accordance with this invention will be installed and fully wired to the lights in some fully accessible location on the frame prior to the mounting of the vehicle body. While the body is being mounted the remote control mechanism may be coiled up with the switch out of the way. The single hole mounting device disclosed in connection with Figs. 6 and 7 permits the operating handle and associated parts to be readily affixed to the vehicle instrument panel after the body is in place and without requiring any inaccessible work to be done behind the panel. The particular operating connections are illustrated merely as one exemplification of a means for carrying out the invention.

The popularity of "under column" switches, operated by shafts extended throughout the length of the steering column, has been attributable to the desire to avoid instrument panel wiring after the body is in place. The use of the present invention avoids the expense of the under column switch, and the special steering gear required therefor. It also makes it possible to locate the switch out of the dirt and grease to which an under column switch is invariably subject. Moreover, the cost of the wiring required is so far reduced by the present invention that it more than compensates for the remote control mechanism. Thus, the present switch and its wiring are even more economical in cost of manufacture than the old type of instrument panel switch; yet the advantages of the present construction include all the advantages of the under column switch, and more.

I claim:

1. The combination with a rock shaft, of a bracket through which said rock shaft projects, said bracket having an offset portion on which a switch is adapted to be mounted, a lever secured to said rock shaft comprising means for the actuation thereof oscillatable in the offset portion of the bracket, and a Bowden wire sheath clamp mounted on said bracket and adapted to hold a sheath in such a position that its wire may be operatively connected with said lever.

2. A bracket having mounting means and an intermediate offset portion, means mounted on said portion having an operating shaft, a lever carried by said shaft and projecting from said means for oscillation in a plane parallel to the general plane of the bracket, means including a Bowden wire operatively connected to said lever for the actuation thereof, and a sheath clamp mounted on said bracket, and a Bowden wire sheath operatively engaged in said clamp and supporting said wire in a position for lever operation.

3. A Bowden wire operator comprising the combination with a mounting bracket having angularly related arms provided with apertures, one of which is adapted to receive and retain a Bowden wire sheath, of a tubular bolt extending through the other of said arms and provided with a head and a nut for clamping engagement with an apertured support, a rock shaft oscillatable in the nut and provided with a handle, and an arm carried by the rock shaft and provided with a wire anchorage in the plane of the first mentioned aperture, whereby the oscillation of said shaft may be utilized to reciprocate a wire in the sheath anchored in said first mentioned aperture.

4. The combination with a tubular support threaded to receive a nut and headed to serve as a single hole panel mounting, of a shaft oscillatable in said support and provided with a handle, a bracket mounted on said support and carrying a Bowden wire sheath anchorage and a lever mounted on said shaft, and means swivelled on said lever providing a Bowden wire anchorage thereon.

5. In a device of the character described, a mounting bracket provided with clamp means and an upstanding arm, a separate clamp means on said arm, said second clamp means and arm being together adapted to provide an anchorage for a Bowden wire sheath, an actuated lever, means providing a mounting on which said lever is oscillatable parallel to said bracket and arm, and means providing a wire anchorage on said lever in such alignment with the position of said sheath anchorage as to be adapted for connection with the wire of a Bowden assembly having its sheath engaged in said sheath anchorage.

ROBERT K. WINNING.